Patented Oct. 12, 1926.

1,602,699

UNITED STATES PATENT OFFICE.

DONALD ARCHER NIGHTINGALE, OF AMBLER, PENNSYLVANIA, ASSIGNOR TO THE KETOID COMPANY, OF WILMINGTON, DELAWARE, A CORPORATION OF DELAWARE.

METHOD OF MANUFACTURING KETENS.

No Drawing.    Application filed July 22, 1924. Serial No. 727,486.

My invention relates to the manufacture of keten and the object of my invention is to provide a method by which this can be produced economically and in a state of purity.

Ketens may be recognized by the general formula $R:C:O$, where R represents an organic divalent radicle as in methyl keten $CH_3CH=C=O$ and keten $CH_2=C=O$. They may be characterized as compounds containing the group CO, that is compounds in which a carbonyl group is doubly linked to a single carbon atom or other organic radicle. The first member of this group is keten which was isolated by Wilsmore in 1907 (Trans. Chem. Soc. 1907, vol. 91.194). It was obtained by decomposition through heat from acetic anhydride and also from acetone but with very low yield on the basis of the anhydride or acetone decomposed. Subsequent to this discovery researches and studies as to the production and properties of ketens as a class have been made but in all cases the production of ketens has been small in proportion to the anhydride or ketone broken down by exposure to heat and therefore unattractive from a commercial point of view.

In general ketens can be produced from organic compounds containing the acyl radicle or group after the type $R=CO$ (where R is an organic radicle, usually a hydrocarbon radicle, for example acetyl $CH_3CO$, and propyl $CH_3CH_2CO$) by heating such compounds to a decomposing point, but, as I have said, the yield of ketens is small as compared with the amount of the compound decomposed. I have discovered, however, that such compounds as are decomposed by heat into compounds including keten can be so decomposed and keten produced with an approximation to theory and a minimum of degenerative decomposition by heating the compound to a decomposing temperature in the presence of a preventive catalyst, that is to say, a substance which will counteract the tendency to degenerative decomposition which exists and makes the production of keten uneconomical where no such catalyst is present.

In the absence of such a catalyst but with a heat treatment otherwise identical with that practised with the catalyst the yield of keten was less than 20% of theory and as much as 80% of the substance treated was destroyed with formation of large volumes of gases chiefly hydrocarbons. In the presence of a preventive catalyst on the other hand I obtain a yield of keten in excess of 80% of the theoretical and but little degenerative decomposition occurs.

As preventing catalysts suitable for use in my process I have found the class of metallic sulphates which are not decomposed by temperatures less than about 700° C. are highly efficient. Specifically, I have successfully used sulphates of chromium, manganese, aluminum, calcium, barium, strontium, magnesium and silver, and of these aluminum sulphate is, I believe, the best, particularly in the production of keten from acetone or acetic anhydride.

A catalytic material with which I have secured good results I have produced by making a clean dry Portland cement into a stiff paste with hot dilute sulphuric acid of approximately 10% strength. I mold this paste into cubes or other convenient shapes which are allowed to dry and set and are then baked.

In using the metallic sulphates I form a saturated solution of the sulphate and impregnate some refractory carrier with the solution, for instance, clean long fibered asbestos is a good carrier for the catalyst.

In carrying out my process the catalyst is placed in a chamber provided with inlet and outlet for the substance to be treated and its product; air is excluded from the chamber and means are provided to maintain the chamber and its contents at the reaction temperature which, for the production of keten from acetone or acetic anhydride, should be between 600° C. and 675° C. Using aluminum sulphate as a catalyst I prefer to hold the temperature at about 635° C. The ketone or anhydride may advantageously be preheated to about 575° C. before introduction into the reaction chamber and may be introduced as a vapor or liquid; but care must be taken that such preheating is not such as will result in degenerative decomposition. Acetone is of course the most available and cheapest compound available for the practice of my invention.

Having now described my invention, what I claim as new and desire to secure by Letters Patent, is:

1. The method of manufacturing keten which consists in subjecting organic compounds which are decomposed by heat into substances including keten to a decomposing temperature in the presence of a preventive catalyst consisting of one or more metallic sulphates which are not decomposed at the temperature to which the compound under treatment is exposed, said catalyst acting to counteract the tendency to decomposition of the keten and to secure an approximately quantitative yield of ketens.

2. The method of manufacturing keten which consists in subjecting organic compounds which are decomposed by heat into substances including keten to a decomposing temperature in the presence of a preventive catalyst consisting of one or more metallic sulphates which are not decomposed at temperatures less than 700° C., said catalyst acting to counteract the tendency to decomposition of the keten and to secure an approximately quantitative yield of ketens.

3. The method of manufacturing keten which consists in subjecting organic compounds which are decomposed by heat into substances including keten to a decomposing temperature between 600° and 675° in the presence of a preventive catalyst consisting of one or more metallic sulphates which are not decomposed at the temperature to which the compound under treatment is exposed, said catalyst acting to counteract the tendency to decomposition of the keten and to secure an approximately quantitative yield of keten.

4. The method of manufacturing keten which consists in subjecting organic compounds which are decomposed by heat into substances including keten to a decomposing temperature of approximately 635° C. in the presence of a preventive catalyst consisting of one or more metallic sulphates which are not decomposed at the temperature to which the compound under treatment is exposed, said catalyst acting to counteract the tendency to decomposition of the keten and to secure an approximately quantitative yield of keten.

5. The method of manufacturing keten which consists in subjecting organic compounds which are decomposed by heat into substances including keten to a decomposing temperature in the presence of a preventive catalyst consisting of aluminum sulphate acting to counteract the tendency to decomposition of the keten and to secure an approximately quantitative yield of ketens.

6. The method of manufacturing keten which consists in subjecting organic compounds which are decomposed by heat into substances including keten to a decomposing temperature of about 635° C. in the presence of a preventing catalyst consisting of aluminum sulphate acting to counteract the tendency to decomposition of the keten and to secure an approximately quantitative yield of keten.

7. The method of manufacturing keten which consists in heating acetone to a decomposing temperature in the presence of a preventing catalyst consisting of one or more metallic sulphates which are not decomposed at the reactive temperature, said catalyst acting to counteract the tendency to decomposition of the keten and to secure an approximately quantitative yield of keten.

8. The method of claim 7, as carried out with the use of aluminum sulphate as a preventing catalyst.

9. The method of claim 7 as carried out at reactive temperatures between 600° and 675° C.

10. The method of claim 7, as carried out at a temperature of about 635° C. with the use of aluminum sulphate as a preventing catalyst.

DONALD A. NIGHTINGALE.